United States Patent [19]

Hill

[11] Patent Number: 5,758,570
[45] Date of Patent: Jun. 2, 1998

[54] PORTABLE COOKING GRILL ASSEMBLY

[76] Inventor: Curtis J. Hill, Shallow Lake Rd., Box 26, Warba, Minn. 55793

[21] Appl. No.: 685,519

[22] Filed: Jul. 24, 1996

[51] Int. Cl.⁶ .............................. F24B 3/00; A47G 29/00
[52] U.S. Cl. .................................................. 99/449; 126/9 B
[58] Field of Search ........................ 99/449, 450; 126/9 R, 126/9 B

[56] References Cited

U.S. PATENT DOCUMENTS

| | | | |
|---|---|---|---|
| 2,974,662 | 3/1961 | Forrest | 126/9 R |
| 3,498,210 | 3/1970 | O'Toole | 126/9 R |
| 3,785,360 | 1/1974 | Martin | 126/9 R X |
| 4,351,312 | 9/1982 | Ivy | 126/9 R X |
| 4,719,898 | 1/1988 | Stanislawski | 126/9 R |
| 4,932,391 | 6/1990 | Bierdeman | 126/9 R |

*Primary Examiner*—Reginald L. Alexander

[57] ABSTRACT

A portable cooking grill assembly includes a ground penetratable base which is essentially a screw mechanism, a support shaft which is detachably mounted to the screw mechanism, a ground stabilizer member which mounts about the support shaft and which has an extended portion which rests upon the ground to help prevent tipping over of the ground penetratable base, a grill bracket mounted upon and adjustable along the support shaft, and a grill member having two grill sections hingedly attached to each other, the grill member being detachably mounted to the grill bracket and being suspended above the ground at selected heights and being disposed generally horizontally. The portable cooking grill assembly can be quickly and easily set up and taken apart and stored in a carrying case which takes up very little space and can be stored in places where conventional cooking grills are too big and can be taken anywhere.

6 Claims, 5 Drawing Sheets

PORTABLE COOKING GRILL ASSEMBLY

BACKGROUND OF THE INVENTION

This invention relates to a portable cooking grill assembly which can be quickly assembled and disassembled and stored in a carrying case and which can be set up essentially anywhere outdoors and can taken anywhere by anybody.

The prior art describes cooking grills each of which has a base or a stand which supports a container having an open top and a cavity therein for supporting charcoal or other materials used to produce a flame or heat to cook food, and having a grill which is suspended above the bottom of the container, and further having a lid for closing over the top of the container. This type of cooking grill usually comes in different sizes and with more or fewer accessories such as temperature control gauges. In either case, this type of cooking grill cannot be disassembled and stored in a carrying case unlike the present invention.

SUMMARY OF THE INVENTION

The present invention relates to a portable cooking grill assembly which comprises a ground penetratable base, a support shaft attached to said base, a ground stabilizer member mounted about the support shaft, a grill bracket also mounted to the support shaft, and a grill member attachable to the grill bracket. This invention can be set up and taken apart in seconds and can be stored in a small carrying case which can be easily and conveniently stored under a seat in a vehicle.

One objective of the present invention is to provide a portable cooking grill assembly which can be conveniently stored in a generally rectangular carrying case which can be stored out of the way in a very small place such as either under a vehicle's seat or even in glove compartment.

Another objective of the present invention is to provide a portable cooking grill assembly which gives users, who may not otherwise be able to tote along a conventional cooking grill such as motorcyclists who don't have the space to tote along a conventional cooking grill or even travelers in cars which don't have the space to carry such a cooking unit along, a means to cook their food.

Yet, another objective of the present invention is to provide a cooking grill assembly which is light enough to be carried by boaters, hunters, and fishermen who may camp overnight in the woods and who need to have a means to cook their food.

Further objectives and advantages of the present invention will become apparent as the description proceeds and when taken in conjunction with the accompanying drawings wherein:

DETAILED DESCRIPTION OF THE INVENTION

Figure 1:
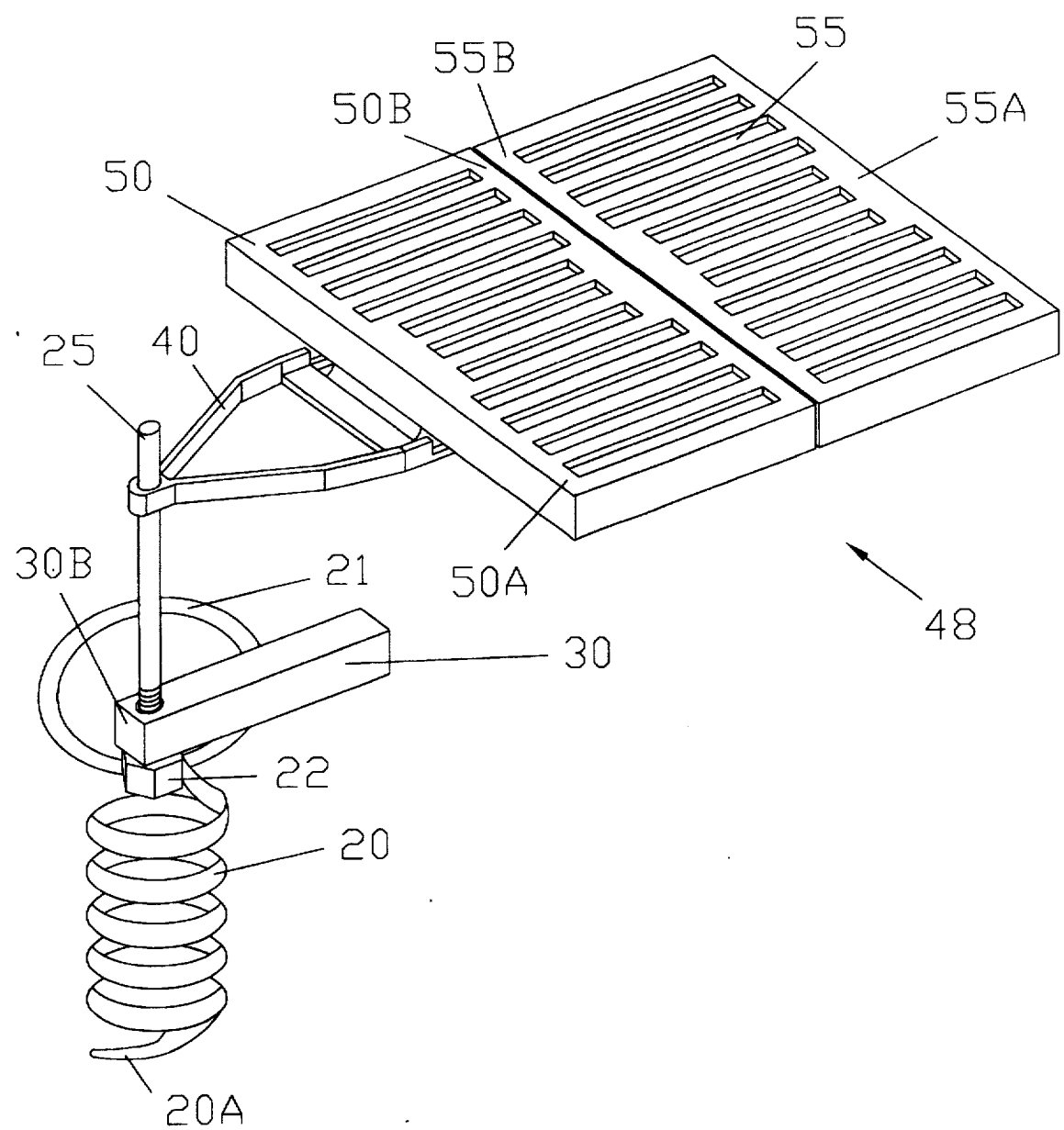
FIG. 1 is a perspective view of the portable cooking grill assembly.

Referring to the drawings in FIGS. 1-5, in particular, the portable cooking grill assembly comprises a support base means which includes a ground penetratable base 15 which is preferably a screw mechanism having a spiral bottom portion 20 and a handle member for the top portion 21 which integrally extends upward from the top of the bottom portion 20. The bottom portion 20 has a pointed bottom end 20a which is structured to penetrate the ground 60. The handle is preferably circular to allow the user to grasp the handle member and screw the bottom portion 20 into the ground 60.

Figure 4:
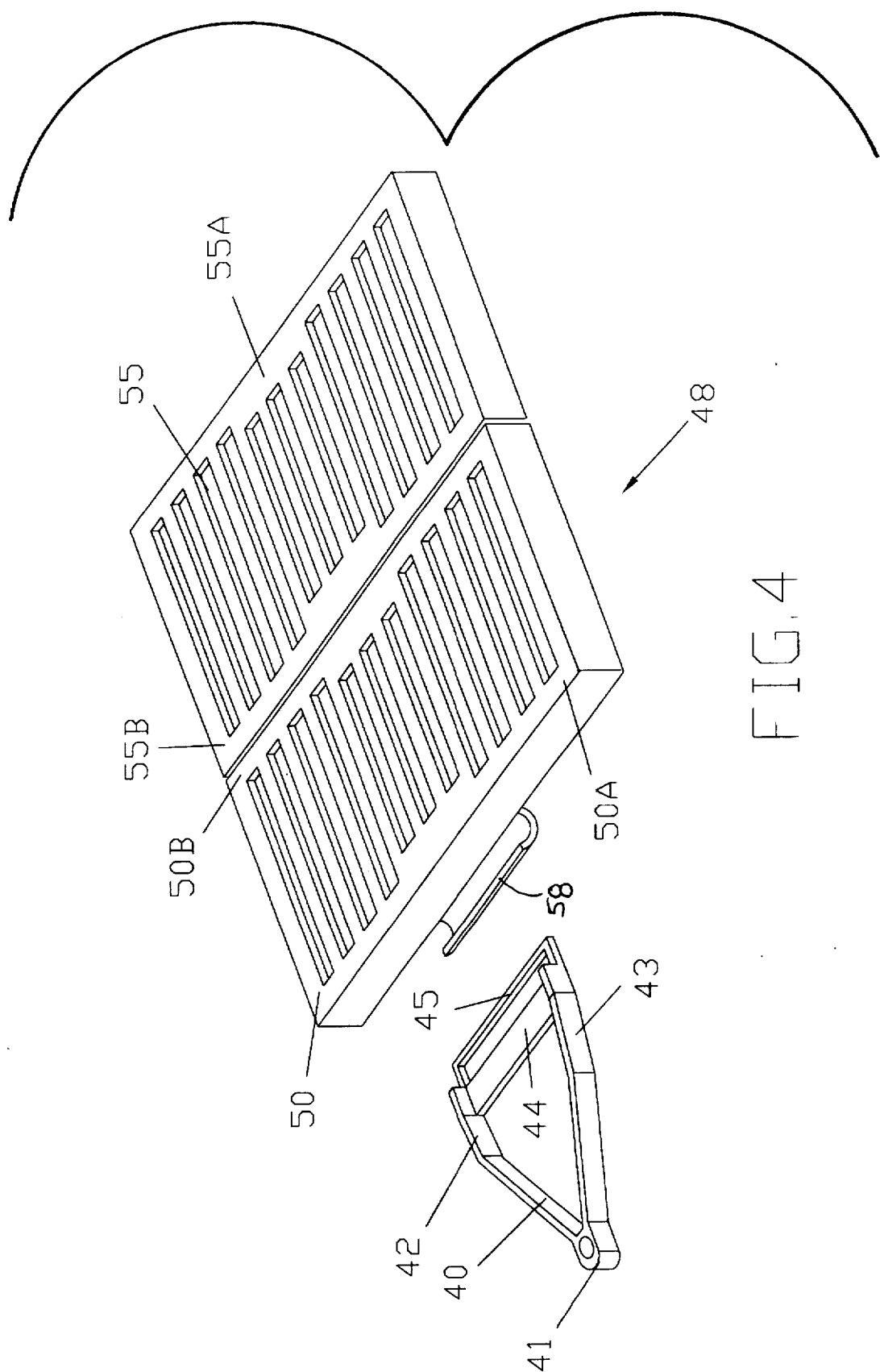
FIG. 4 is a detailed perspective view of the grill bracket and the grill member detachably mounted thereto.
Figure 5:
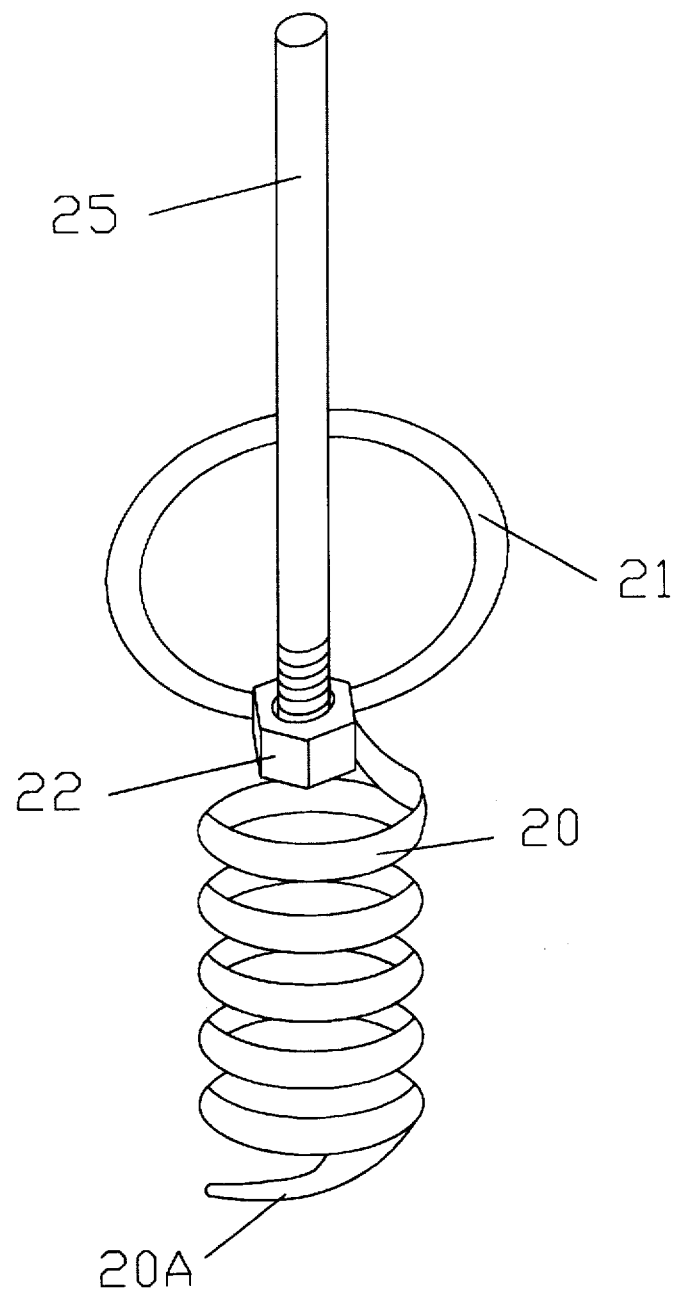
FIG. 5 is a detailed perspective view of the ground penetratable base and support shaft threaded into the threaded member which is fixedly attached to the base.

As shown in FIG. 5, the portable cooking grill assembly further comprises a support shaft 25 which has a threaded bottom portion 25a for threading into a threaded keeper such as a nut which is an element of the support base means and which is fixedly attached or welded to the joint of the bottom and top portion 21 of the ground penetratable base 15. The support shaft 25 essentially extends upward and has a longitudinal axis which is generally in alignment to the longitudinal axis of the bottom portion 20 of the screw mechanism. The support shaft 25 supports a ground stabilizer member 30 which is also an element of the support base means and which is essentially a bar having a bore 30a extending laterally through the bar near a proximate end thereof, the bore 30a being adapted and dimensioned to receive the support shaft 25 therethrough. The ground stabilizer member 30 mounts and slides over the support shaft 25 with the distal portion 30c relative to the bore 30a being structured to rest upon the surface of the ground 60 and the proximate portion 30b relative to the bore 30a essentially resting upon the threaded keeper. The support shaft 25 also supports a grill bracket 40 which, as shown in FIG. 4, is elongated and curved, has an eyelet 41 at a proximate end, a pair of extended members 42,43 integrally attached to and extending outwardly from the eyelet 41 and being slightly angled away from each other. A crosspiece 44 interconnects the distal ends of the two extended members 42,43 relative to the eyelet 41 and extends slightly beyond the distal ends of the two extended members 42,43. A catch-receiving slot 45 extends longitudinally through the crosspiece 44, the slot 45 being dimensioned and adapted to receive a generally curved lip or catch member 58 which extends from a side end of the grill member 48.

The grill bracket 40 is mounted upon the support shaft 25 with the support shaft 25 extending through the eyelet 41. The grill bracket 40 is adjustable along the length of the support shaft 25 with the grill member 48 being mountable to the grill bracket 40. The grill member 48 has two grill sections 50,55 each of which has two side ends 50a–b, 55a–b, a back end and a front end. The grill sections 50,55 are hingedly attached to each other at a respective side end 50b,55b of each grill section 50,55. The curved catch member 58 on the grill member 48 extends outward from the nonhinged side end 50a of one of the grill sections 50,55 and is centrally disposed along the side end 50a. The curved catch member 58 is adapted to extend through the catch-receiving slot 45 and to engage a portion of the crosspiece 44 so that the grill member 48 does not fall off the grill bracket 40. A side end portion of the grill member 48 rests upon the portion of the crosspiece 44 which extends beyond the distal ends of the extended members 42,43 such that the grill member 48 extends generally horizontally so that food, pots, and pans can rest upon the grill member 48 without them falling off.

Figure 2:
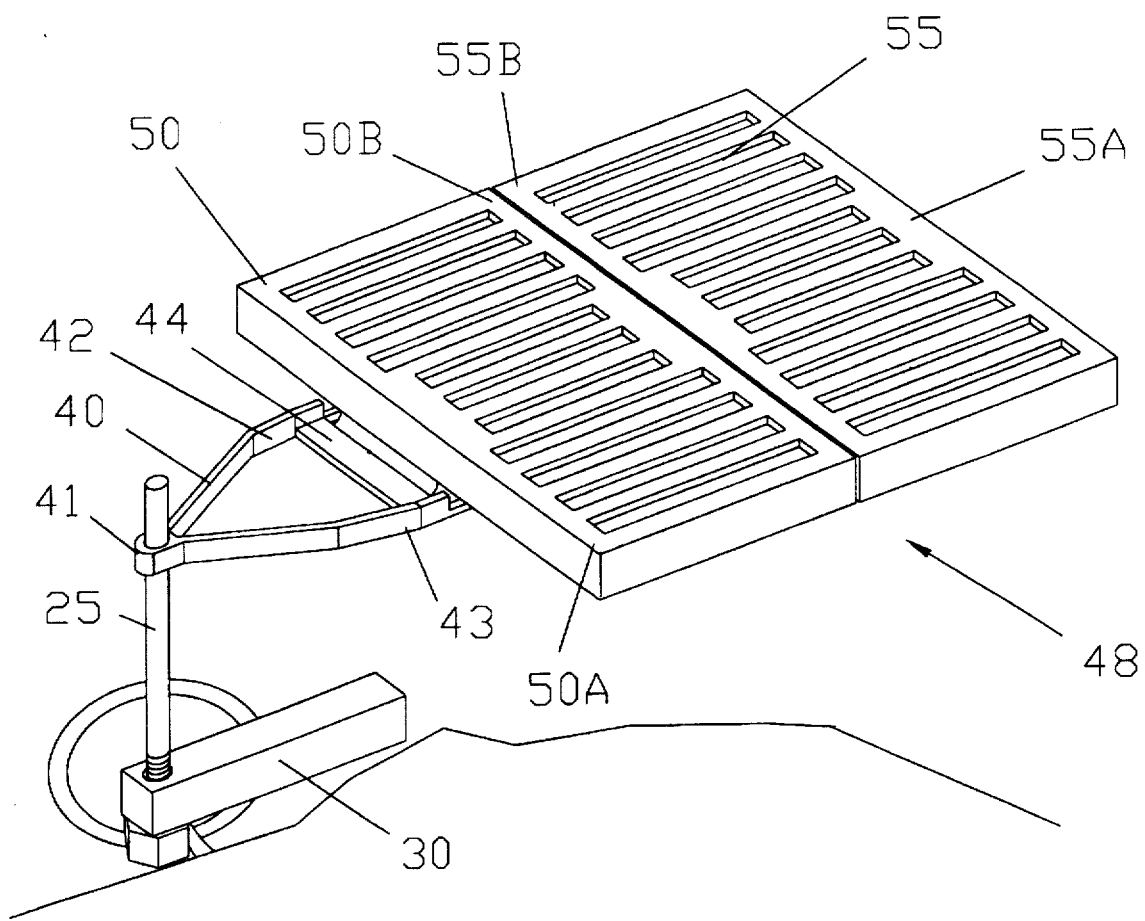
FIG. 2 is a perspective view of the portable cooking grill assembly in operational use.
Figure 3:
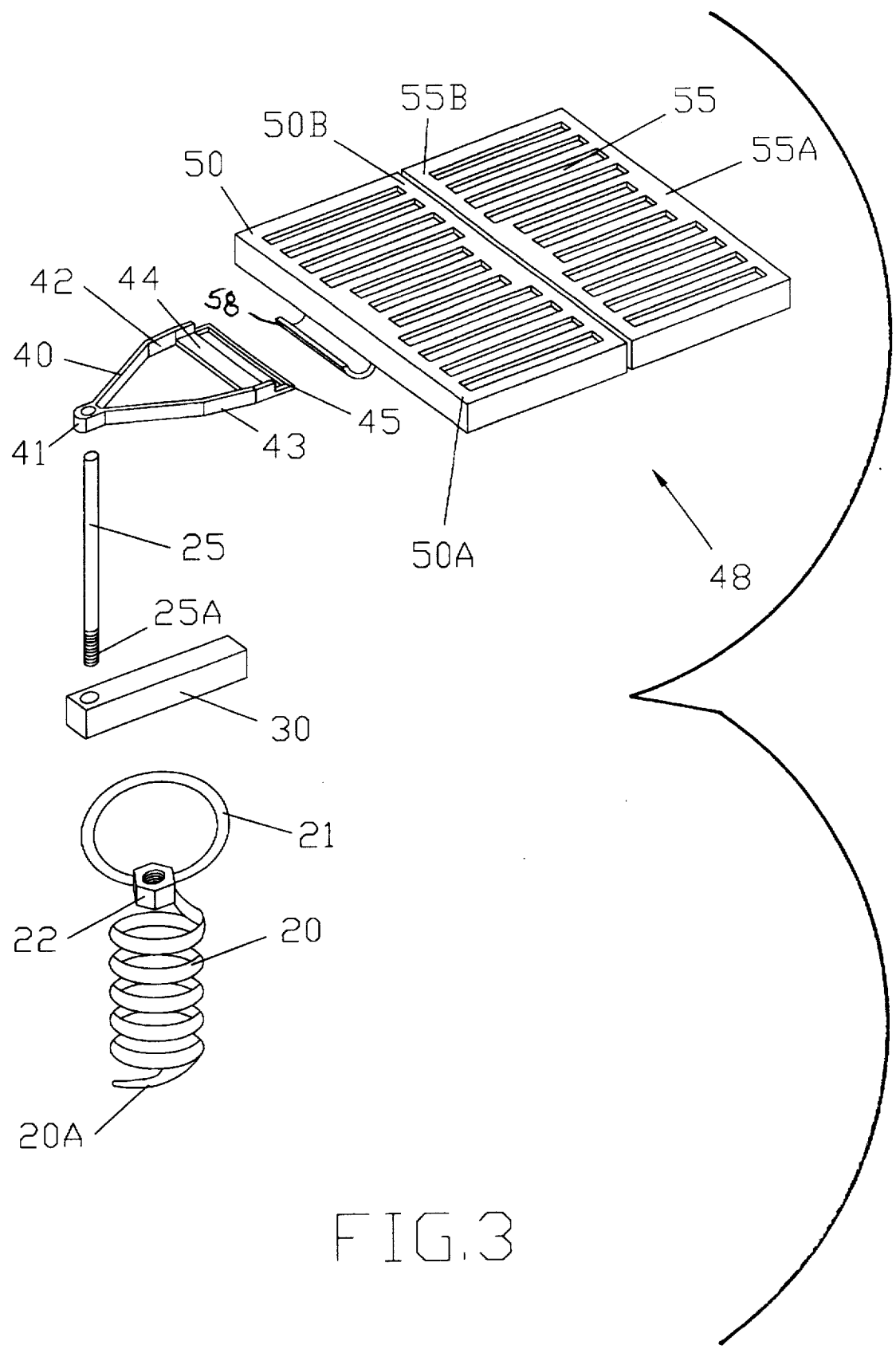
FIG. 3 is an exploded perspective view of the portable cooking grill assembly.

As shown in FIG. 2, to use the portable cooking grill assembly, the user screws the screw mechanism into a suitable area of the ground 60 where material used for cooking can be safely burned; then threads the support shaft 25 into the keeper with the support shaft 25 being disposed generally vertical; next slides the ground stabilizer member 30 over the support shaft 25, that is, positions the ground stabilizer member 30 over the support shaft 25 and moves the ground stabilizer member 30 along the length of the support shaft 25 with the support shaft 25 moving through the bore 30a of the ground stabilizer member 30 until the ground stabilizer member 30 comes to rest upon the keeper and the ground 60, the ground stabilizer member 30 being directed toward where the material is to burned; then slides the eyelet 41 of the grill bracket 40 over the support shaft 25 and adjustably positions the grill bracket 40 along the length of the support shaft 25; and attaches the grill member 48 to the grill bracket 40 such that the grill member 48 is suspended above the ground 60 and is disposed generally horizontally so that food, pots and pans can rest and remain upon the grill member 48. The user can then place whatever material one wishes to use to cook the food under the grill member 48.

After the user has finished using the portable cooking grill assembly, the user can easily disassemble and clean it and put the components into a carrying case, the size of which is small enough to fit easily under the seat of a vehicle or in a saddle bag on a motorcycle or in a certain glove compartment generally out of the way of the user, and usually in a space of which a conventional cooking grill could not be put. This invention not only saves space but also allows hunters, hitchhikers, campers, and backpackers to take along a cooking grill assembly; whereas, they wouldn't be able to do so with conventional cooking grills.

Various changes and departures may be made to the invention without departing from the spirit and scope thereof. Accordingly, it is not intended that the invention be limited to that specifically described in the specification or as illustrated in the drawings but only as set forth in the claims:

What is claimed is:

1. A portable cooking grill assembly comprising:
   a support base means including a ground penetratable base for penetrating the ground, said ground penetratable support base means comprising a screw mechanism having a spiral bottom portion for penetrating into said ground and further having a top portion which includes a handle member to conveniently operate said screw mechanism;
   a means for supporting a grill member in cooperation with said support base means; and
   said grill member.

2. A portable cooking grill assembly as described in claim 1, wherein said bottom portion of said screw mechanism further includes a pointed bottom end for effective penetration into said ground.

3. A portable cooking grill assembly comprising:
   a support base means including a around penetratable base for penetrating the ground;
   a means for supporting a grill member in cooperation with said support base means comprising a support shaft which is mountable to said ground penetratable base, and further comprising a grill bracket which is adjustably mounted to said support shaft; and said grill member which has a side end and a catch member fixedly attached to said side end for mounting to said grill bracket.

4. A portable cooking grill assembly as described in claim 3, wherein said grill bracket has a catch-receiving slot at a distal end thereof for receiving said catch member and for engaging a portion of said grill bracket.

5. A portable cooking grill assembly as described in claim 4, wherein said grill bracket is elongated and curved such that when said grill member is mounted to said grill bracket, said grill member will be disposed substantially horizontally and will be suspended above the ground.

6. A portable cooking grill assembly as described in claim 3, wherein said grill member has a pair of grill sections which are hingedly attached to and foldable upon one another so that said grill member can be conveniently stored in a carrying case.

* * * * *